United States Patent
Baskin

(10) Patent No.: US 6,212,742 B1
(45) Date of Patent: Apr. 10, 2001

(54) DRIP TRAY CLAMPS FOR TRANSFORMER FUSE HOLDERS

(75) Inventor: John B. Baskin, Jackson, TN (US)

(73) Assignee: ABB Power T & D Company Inc., Raleigh, NC (US)

(*) Notice: Subject to any disclaimer, the term of this patent is extended or adjusted under 35 U.S.C. 154(b) by 0 days.

(21) Appl. No.: 09/240,248

(22) Filed: Jan. 29, 1999

(51) Int. Cl.⁷ ................................ B65D 63/00; F16L 3/08
(52) U.S. Cl. .................. 24/457; 24/16 PB; 24/30.5 P; 24/543; 248/74.3
(58) Field of Search .......................... 24/457, 458, 487, 24/30.5 P, 17 AP, 16 PB, 543; 337/204; 248/74.3

(56) References Cited

U.S. PATENT DOCUMENTS

| | | |
|---|---|---|
| 1,520,511 | 12/1924 | Reymore . |
| 1,716,530 | 6/1929 | Oliver . |
| 3,194,526 | 7/1965 | Lemmond ........................ 248/226 |
| 3,370,820 | 2/1968 | Liss et al. ........................ 248/311 |
| 3,571,861 * | 3/1971 | Olson ........................... 24/30.5 P |
| 4,220,301 * | 9/1980 | Jacobs et al. .................... 24/16 PB |
| 4,291,698 * | 9/1981 | Fuchs et al. ....................... 24/543 |
| 4,534,089 * | 8/1985 | Swan ............................. 24/30.5 P |
| 4,728,071 | 3/1988 | Salacuse ........................ 248/316.5 |
| 4,780,925 | 11/1988 | Sherman ........................... 15/210 |
| 4,958,791 * | 9/1990 | Nakamura ....................... 24/16 PB |
| 5,109,576 * | 5/1992 | Teekell et al. ................... 24/30.5 P |
| 5,204,654 | 4/1993 | Hay .............................. 337/204 |
| 5,230,496 | 7/1993 | Shillington et al. ............. 248/316.5 |
| 5,241,753 | 9/1993 | Lalevee, Sr. ...................... 33/726 |
| 5,325,897 | 7/1994 | Richardson et al. ................ 141/86 |
| 6,059,368 * | 5/2000 | Stumpf et al. .................. 297/440.11 |

OTHER PUBLICATIONS

RTE Bay–O–Net Fuse Assembly Drip Guard, Electrical Apparatus 240–41, manufactured by Cooper Power Systems, Inc. of Waukesha, Wisconsin [Apr. 1996].

Brochure for "Tuf–Cup Drip Shield For Bayonet Fuse Holders", by Central Moloney Components, Pine Bluff, Arkansas, Jul. 1, 1993.

Oil Drip Shield, manufactured by Howard Industries, Inc. of Laurel, Massachusetts [Dec. 20, 1995].

* cited by examiner

*Primary Examiner*—Victor N. Sakran
(74) *Attorney, Agent, or Firm*—Woodcock Washburn Kurtz Mackiewicz & Norris LLP

(57) ABSTRACT

A clamp for mounting a drip tray to a transformer fuse holder has only two connecting members which are a first arm and a second arm. The first arm comprises a proximal end attached to the drip tray and a distal male end. The second arm comprises a proximal end attached to the drip tray and a distal female end. The male end comprises an insertion member, a male mating detent protruding from the insertion member, and a male locking detent protruding from the male end. The female end comprises a receiving member, a female mating detent protruding from the receiving member, and a female locking detent protruding from the receiving member. When the insertion member mates with the receiving member, the male mating detent and the female mating detent align, and the male locking detent and the female locking detent align such that the clamp becomes locked in three perpendicular directions.

12 Claims, 7 Drawing Sheets

DRIP TRAY CLAMPS FOR TRANSFORMER FUSE HOLDERS

FIELD OF THE INVENTION

This invention relates generally to protective fuse assemblies for liquid-cooled transformers, and more particularly, to drip trays used to capture oil that escapes the confines of a transformer tank when a submerged, bayonet-type fuse is removed from the transformer tank.

BACKGROUND OF THE INVENTION

Bayonet-style circuit breakers or fuses serve to protect an electrical system such as a transformer from overload (or transformer failure) resulting in a short circuit. With these devices, a fuse is inserted into a tubular fuse housing mounted in a tank and having a pair of contacts in its lower end. A typical fuse housing device is disclosed in U.S. Pat. No. 5,204,654, entitled "Fuse Housing Having Fluid Sealing Assembly," and is hereby incorporated herein by reference in its entirety.

Bayonet-style fuses are designed to operate under oil and be easily replaceable after operation. They are installed by attaching it to one end of a fuse holder which is then pushed through the opening in the transformer tank wall and into the tubular fuse housing until the fuse is submerged in oil between the two contacts. The opposite (or upper) end of the fuse holder seals the top opening in the fuse housing. After the fuse has operated, the fuse and holder are withdrawn from the housing and a new fuse is attached to the holder and inserted.

While the foregoing design allows quick removal of the fuse, it requires the air-oil interface to be well below the tank wall opening to prevent oil from draining through the tank wall opening in the fuse housing as the fuse and fuse holder are withdrawn. Even with the air-oil interface below the tank wall opening, certain factors like heat and pad-tilt can cause the oil level to rise to a point above the opening in the tank wall. For example, on larger pad-mounted transformers, temperature induced oil height variations cause the oil level to fluctuate between approximately −2.5 inches and +3.25 inches on a 72 inch high tank. In addition, a pad-tilt angle of 2 or 3 degrees can shift the oil height an additional 1 inch on a 40 inch deep (front to back) tank.

When the fuse is removed, oil often escapes from the fuse housing opening causing contamination of the transformer oil and possible damage to rubber termination systems mounted onto the transformer front plate. This spillage is more likely when the oil height is elevated. It also is common for oil that has escaped to spill onto the floor on which the transformer is mounted. This, especially when unseen or not cleaned properly, results in a hazardous work environment for those who replace the fuses and others who work with or nearby the transformer tanks.

Consequently, devices for capturing the oil that escapes the confines of the transformer tank when the fuse is removed have been designed and implemented to alleviate the problems resulting from dripping oil. Such devices, called drip guards or drip trays, usually are mounted to the upper end of the fuse holder just outside the wall of the transformer to prevent dripping of oil or other insulating fluids onto molded rubber terminators, cables and arresters during removal of the bayonet-style fuses. The trays protect rubber products that may not be chemically compatible with the dielectric fluid.

One such drip tray is the RTE® Bay-O-Net Fuse Assembly Drip Guard, manufactured by Cooper Power Systems, Inc. of Waukesha, Wis. Another is a drip tray manufactured by Central Moloney, Inc. of Pine Bluff, Ark. A third is an oil drip shield manufactured by Howard Industries, Inc. of Laurel, Mass.

One drawback of these conventional drip trays, however, is that they are cumbersome to operate and mount on a fuse holder, typically requiring two free hands. Another drawback of these conventional drip trays is that they do not have or maintain a firm mount on the fuse holders. It is, therefore, desirable to provide a clamp for drip tray that facilitates mounting of the drip tray on a fuse holder and improves the strength of the mount itself.

SUMMARY OF THE INVENTION

A clamp for mounting a first article to a second article is provided. The clamp has only two connecting members which are a first arm and a second arm. The first arm comprises a proximal end attached to the first article and a distal male end. The second arm comprises a proximal end attached to the first article and a distal female end.

The male end comprises an insertion member, a male mating detent protruding from the insertion member, and a male locking detent protruding from the male end. The female end comprises a receiving member, a female mating detent protruding from the receiving member, and a female locking detent protruding from the receiving member. When the insertion member mates with the receiving member, the male mating detent and the female mating detent align, and the male locking detent and the female locking detent align so that the clamp becomes locked in three perpendicular directions.

Preferably, the clamp of the present invention is used for mounting a drip tray to a transformer fuse holder. In this preferred embodiment, the drip tray is the first article and the fuse holder is the second article.

In a preferred embodiment, when the insertion member mates with the receiving member, the male end and female end are in a single plane and the male mating detent, the female mating detent, the male locking detent and the female locking detent prevent the male end and the female end from moving out of the single plane. In addition, a preferred clamp further comprises a base portion situated between the proximal ends and the first article to connect the arms to the first article and aid in mounting the first article to the second article.

Preferably, the clamp's receiving member further comprises a base lip portion having a proximal end attached to the second arm, a narrow arched member having a proximal end and distal end, the proximal end of the arched member extending from the proximal end of the base lip portion, and a tip extending from the distal end of the arched member so that the base lip portion, the arched member and the tip define a receptacle within which the insertion member can be received.

In addition, the clamp's arched member preferably is flexible so that when the arched member is flexed from its natural state, the insertion member can gain access to the receptacle, yet properly mate with the receiving member when the arched member is in its natural state. When the arched member is not flexed, the receptacle has a substantially triangular-shaped cross section when viewed from a front perspective, the insertion member is an insert having a substantially triangular-shaped cross section when viewed from the front perspective.

Another feature of the preferred embodiment of the clamp is that the tip of the receiving member has a substantially triangular-shaped cross section when viewed from the front perspective, and the receiving member has a substantially C-shaped cross section when viewed from the front perspective. The first arm and second arm also are preferably flexible such that they can be flexed to surround the second article.

DETAILED DESCRIPTION OF THE PREFERRED EMBODIMENTS

Figure 1:
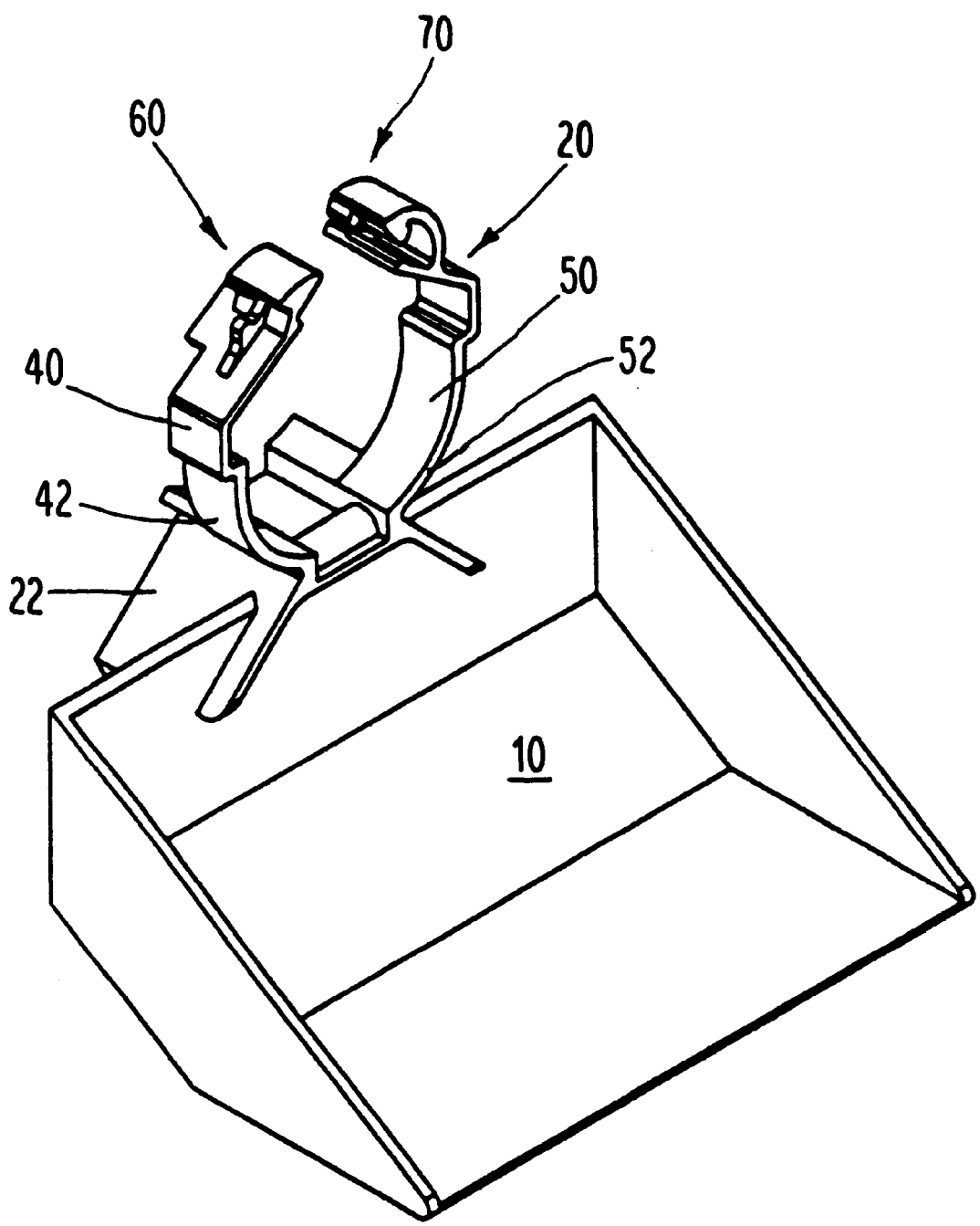
FIG. 1 is an isometric view of a drip tray and clamp according to the present invention.
Figure 2:
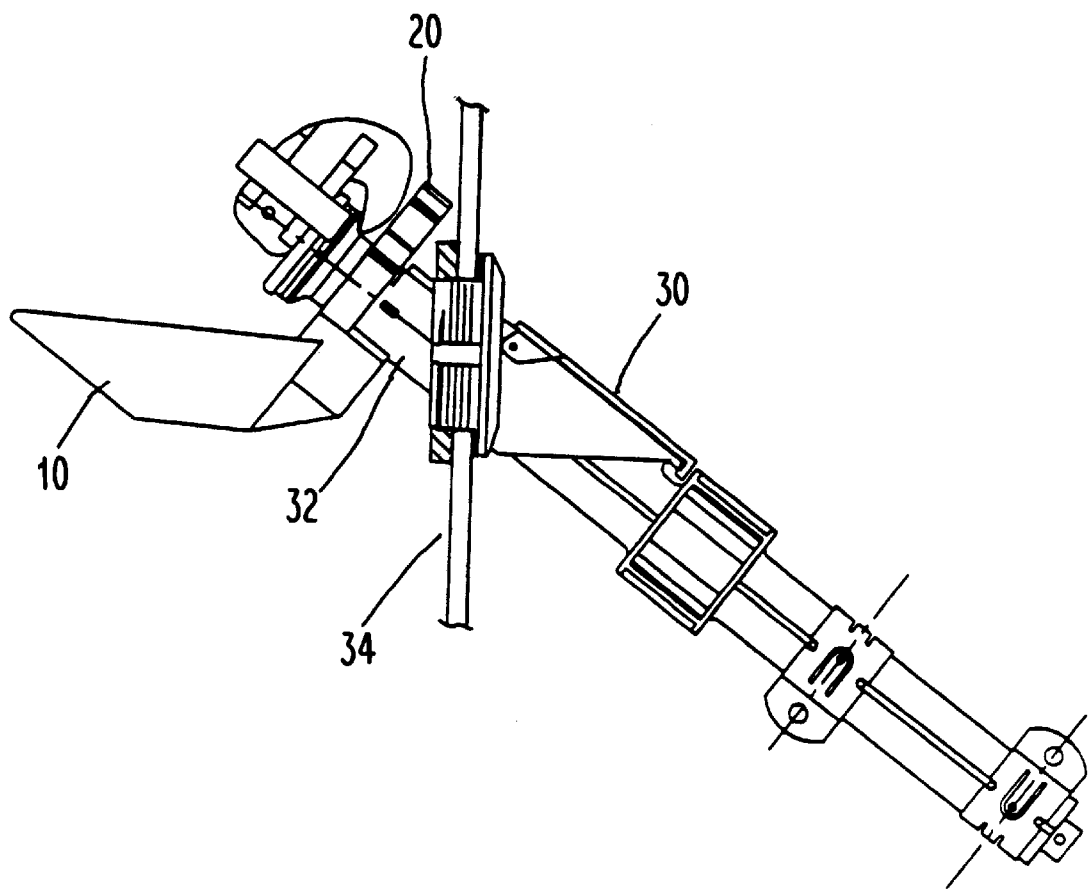
FIG. 2 is a side view of the drip tray and clamp of FIG. 1 in cooperation with a fuse holder and transformer wall.

In accordance with the present invention, an improved clamp for mounting a drip tray to a transformer fuse holder is provided. The clamp of the present invention provides easier mounting and increased mounting strength. Referring to the drawings, there is shown in FIG. 1 a drip tray 10 and a preferred embodiment of a clamp 20 according to the present invention. FIG. 2 shows a side view of the drip tray 10 and clamp 20 of FIG. 1 in cooperation with a transformer 34 and fuse holder 30. The clamp 20 mates with the upper end 32 of the fuse holder 30, which protrudes from the wall of the transformer 34, where the fuse holder 30 is attached.

As shown in FIGS. 1 and 2, the drip tray 10 serves to collect oil (or other fluid) drippings as a fuse is removed from the fuse holder 30. The clamp 20 serves to properly position the drip tray 10 by fixing the drip tray 10 to the fuse holder 30. Preferably, the clamp 20 is injection molded of a plastic such as polypropylene, more preferably 10% glass-filled polypropylene and is integrally formed with the drip tray 10.

The clamp 20 of the present invention comprises two arms 40 and 50. Arm 40 has a proximal end 42 where it is attached to the drip tray 10 and a distal male end 60 where it mates with arm 50. Arm 50 has a proximal end 52 where it is attached to the drip tray 10 and a distal female end 70 where it mates with the male end 60 of arm 40. Preferably, and as is conventional, the proximal ends 42 and 52 of arms 40 and 50 are attached to a base portion 22 of the clamp 20. The base portion 22 serves to connect the arms 40 and 50 to the drip tray 10 and aids in mounting the drip tray 10 to the fuse holder 30.

Figure 3:
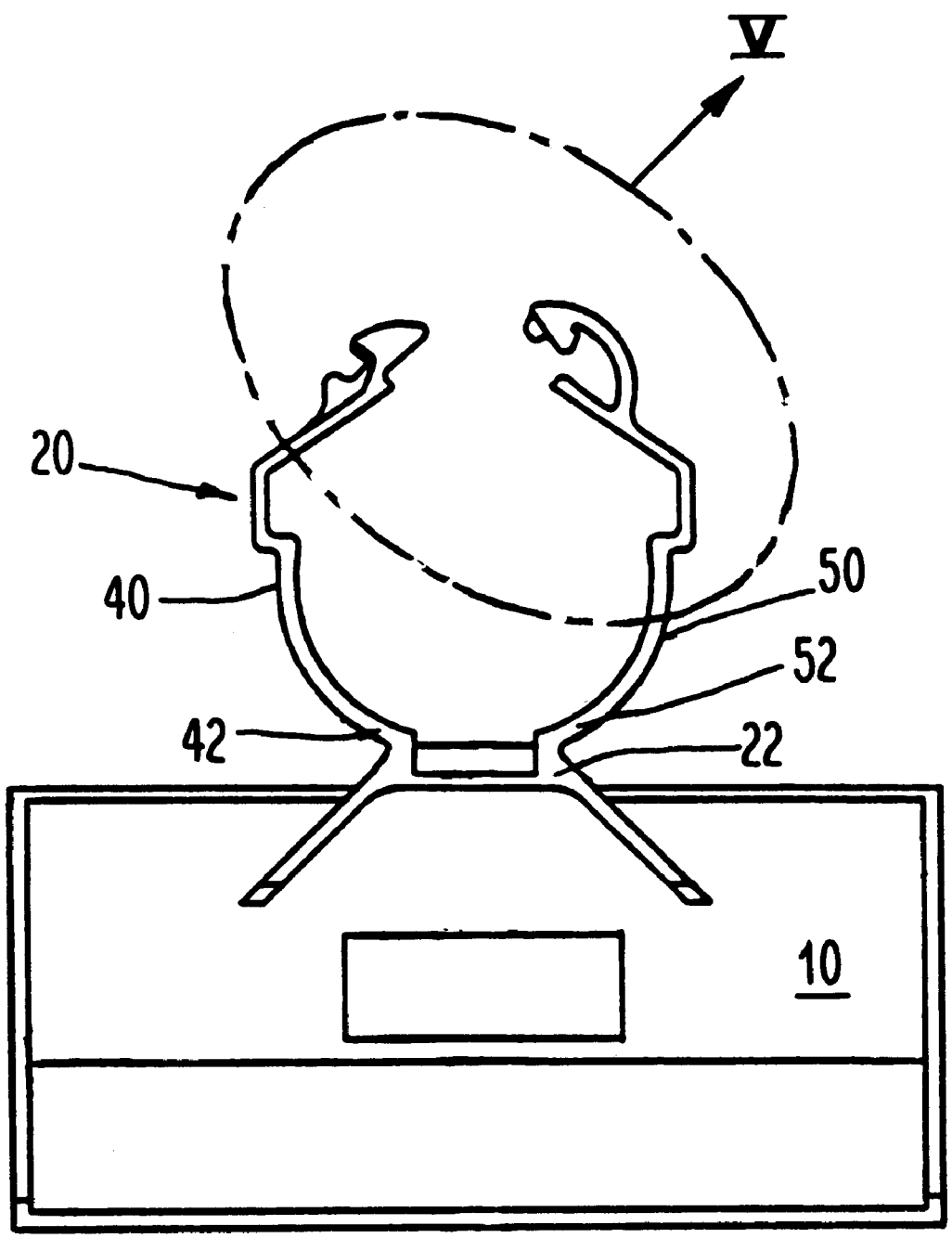
FIG. 3 is a front view of the clamp of FIG. 1 in cooperation with a drip tray.
Figure 4:
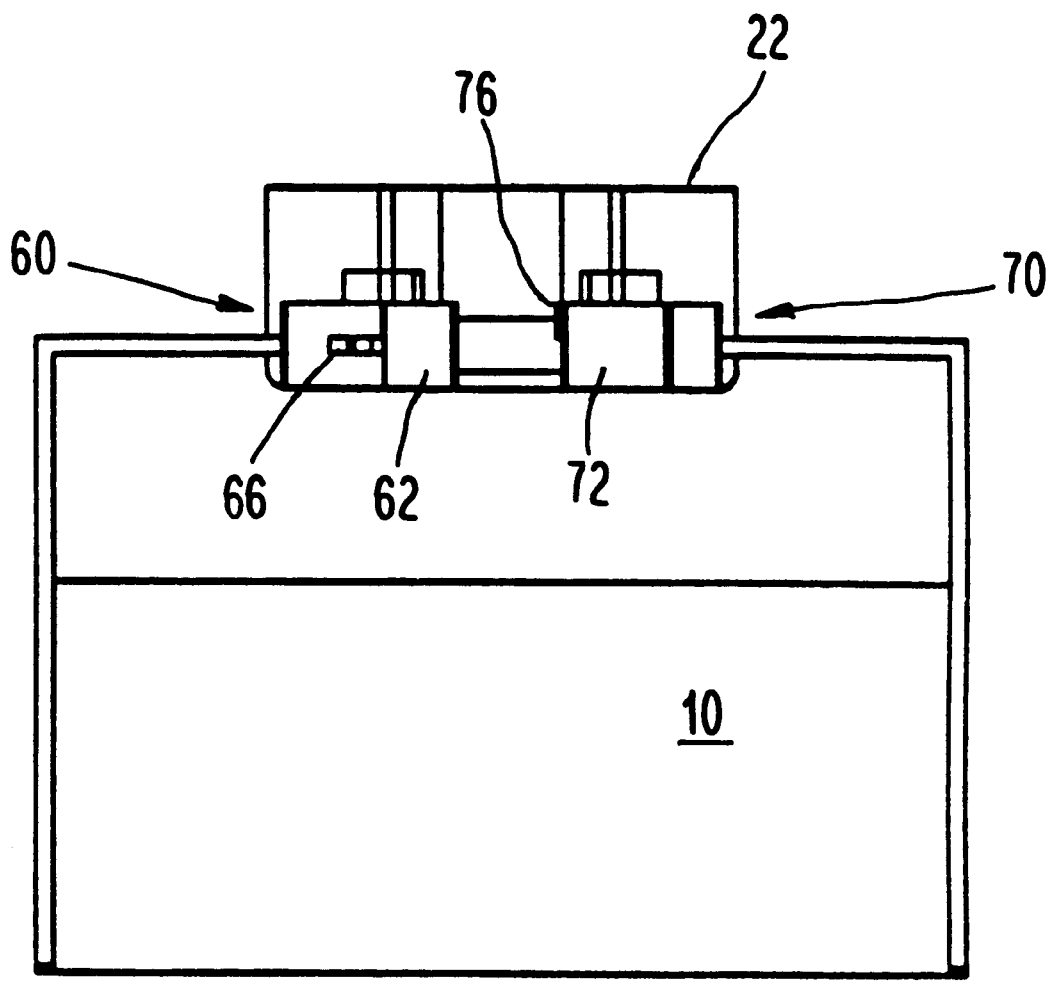
FIG. 4 is a top view of the clamp of FIG. 1 in cooperation with a drip tray.

Preferably, as is conventional, arms 40 and 50 are flexible so that they can encircle the fuse holder 30, and biased to meet in their steady-state position so that the male end 60 and female end 70 can mate to properly clamp the drip tray 10 to the fuse holder 30. A front view of the clamp 20 of FIG. 1 is shown in FIG. 3, yielding a slightly angled top view of the drip tray 10 and clamp 20. A top view of the clamp 20 is shown in FIG. 4 and an enlarged view of section V of FIG. 3, detailing the male 60 and female 70 ends of arms 40 and 50, is shown in FIG. 5.

Figure 5:
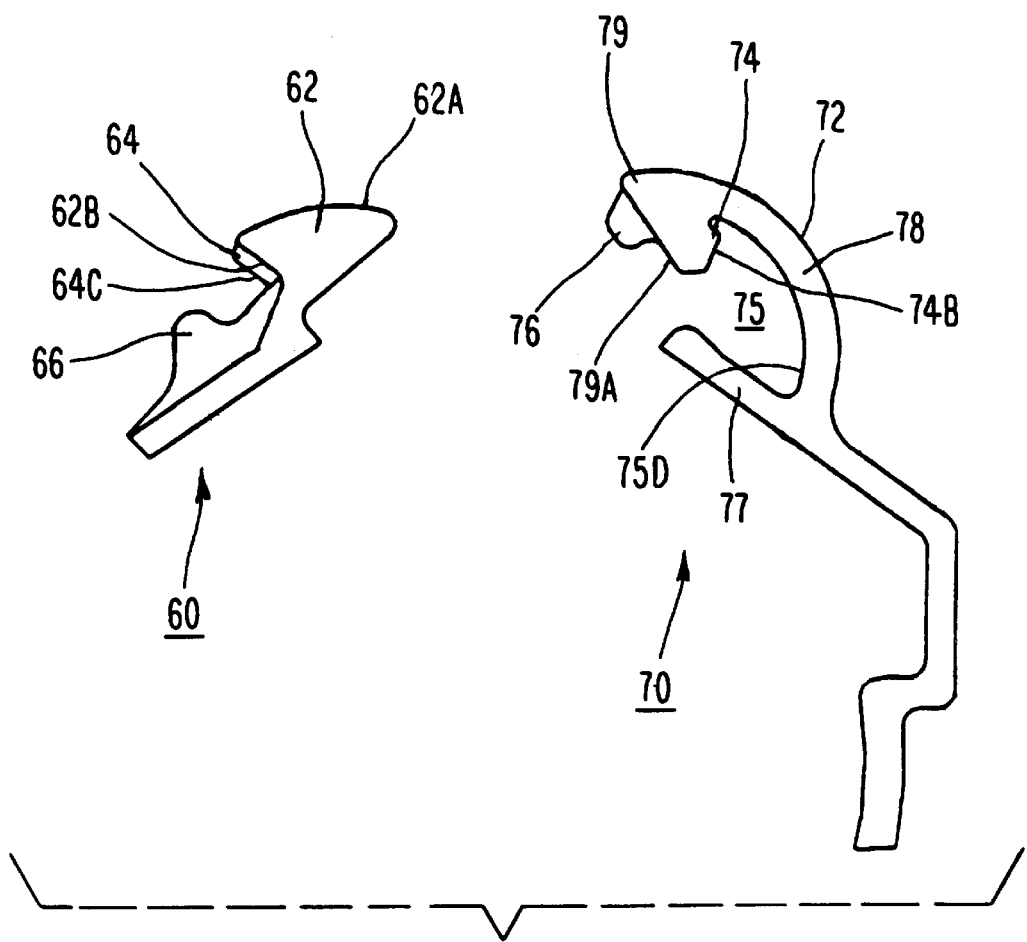
FIG. 5 is an enlarged view of section V of FIG. 3.

As shown in FIG. 5, the male end 60 comprises an insertion member 62, a male mating detent 64 and a male locking detent 66. The female end 70 comprises a receiving member 72, a female mating detent 74 and a female locking detent 76. From a front view of the clamp 20 as shown in FIG. 5, the receiving member 72 further comprises a base lip portion 77, a relatively long and narrow arched member 78, and a substantially triangular-shaped tip 79, thereby defining a substantially triangular-shaped receptacle 75, giving the receiving member 72 a substantially C-shaped cross section. The insertion member 62 is a substantially triangular-shaped insert, designed to mate easily with the substantially triangular-shaped receptacle 75 of the receiving member 72.

Figure 6:
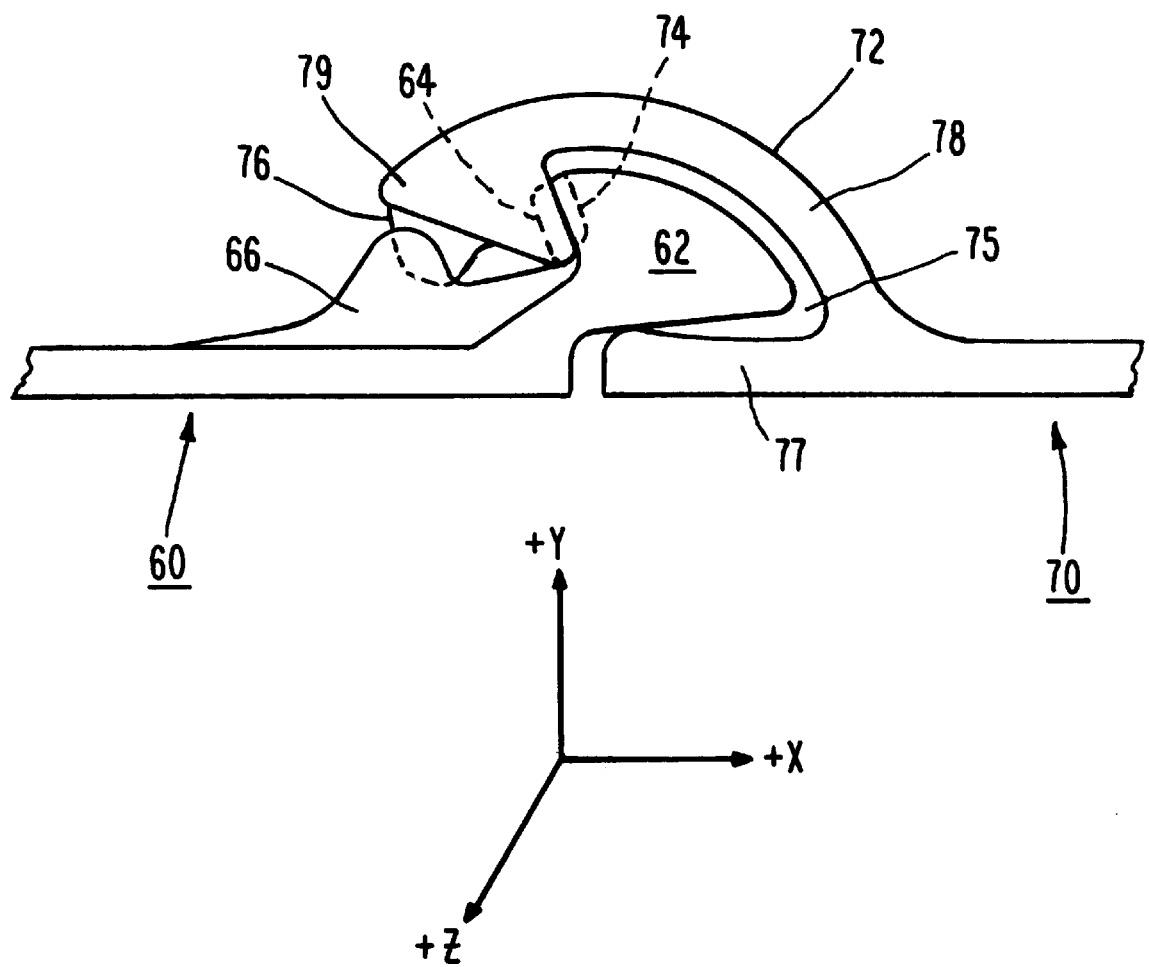
FIG. 6 is an enlarged front view of a mated and locked clamp of the present invention.

Once the male end 60 and female end 70 have encircled the upper end 32 of the fuse holder 30, the insertion member 62 of the male end 60 is inserted into the receiving member 72 of the female end 70 to achieve mating as shown in FIG. 6. The insertion member 62 and receiving member 72 are shaped so that face 62A of the insertion member 62 contacts and slides along face 79A of the tip 79 of the receiving member 72 until mating is achieved. The arched member 78 is flexible so that the insertion member 62 can slide between the tip 79 and the base lip 77 of the receiving member 72. When face 62A is sliding against face 79A, the arched member 78 flexes to allow entry of the insertion member 62 into the receptacle 75. The arched member 78 also is biased so that after it is flexed, it returns to its original steady-state shape, or its mated position, as shown in FIG. 6.

At approximately the same time mating occurs, the clamp 20 becomes locked in place. FIG. 6 shows an enlarged front view of a mated and locked clamp 20 of the present invention. The insertion member 62 and the receiving member 72 substantially lock the male 60 and female 70 ends (and thereby arms 40 and 50) in place in both the x and y directions. In addition, when the insertion member 62 of the male end 60 is situated in the receiving member 72 of the female end 70, the mating detents 64 and 74 and the locking detents 66 and 76 all serve to keep the ends 60 and 70 of the clamp 20 in line, i.e., in the same plane as the arms 40 and 50 of the clamp 20 (the x–y plane as shown in FIG. 6). Thus, the mating detents 64 and 74 and locking detents 66 and 76 serve to lock the ends 60 and 70 in the z direction.

The male mating detent 64 prevents the female end 70 from moving in the negative z direction and the female mating detent 74 prevents the male end 60 from moving in the positive z direction. In a similar fashion, the male locking detent 66 prevents the female end 70 from moving in the positive z direction and the female locking detent 76 prevents the male end 60 from moving in the negative z direction.

Figure 7:
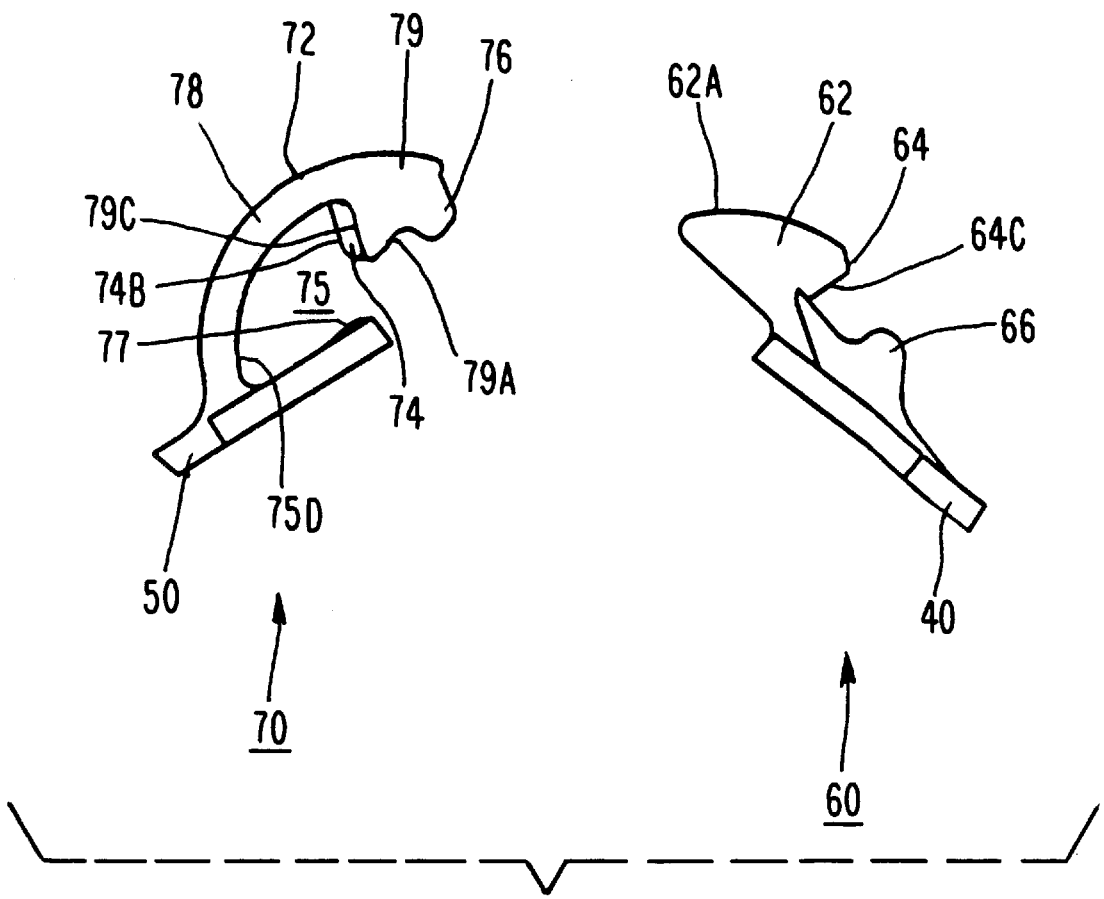
FIG. 7 is a rear view of the enlarged section of the clamp of FIG. 5.

FIG. 7 shows a rear view of the enlarged section of the clamp 20 of FIG. 5. When locked, the insertion member 62 and the receiving member 72 substantially lock the male 60 and female 70 ends in place in both the x and y directions by means of several surfaces. Face 62B of the insertion member 62 contacts face 74B of the female mating detent 74; face 64C of the male mating detent contacts face 79C of the tip 79 of the receiving member 72; and face 62A of the insertion member contacts face 75D of the receiving member.

Locking the clamp 20 and its respective arms 40 and 50 in the z direction as well as the x and y directions provides a clamp that is easy to use and locks in these three perpendicular directions. Thus, the clamp 20 of the present invention facilitates mounting of the drip tray 10 on a fuse holder 30 and improves the strength of the mount itself by locking the clamp 20 of the drip tray 10 in all three directions.

Furthermore, mating and locking of the clamp 20 of the present invention is accomplished in one easy motion. A user simply inserts the insertion member 62 of the male end 60 into the receiving member 72 of the female end 70. Similarly, unlocking the clamp 20 of the present invention also is accomplished with one easy motion. A user simply exerts upward force (in the positive y direction) on the tip 79 (FIG. 6) of the receiving member 72 of the female end 70 to flex the arched member 78 and thereby, unlatch insertion member 62 from the receiving member 72. During this unlatching and while the arched member 78 is flexing, face 62B of the insertion member 62 slides against face 74B of the female mating detent 74; face 64C of the male mating detent slides against face 79C of the tip 79 of the receiving member 72.

Another aspect of the clamp 20 of the present invention is that it only has two connecting members, i.e., the two arms 60 and 70. This simplicity aids in facilitating mounting and detaching of the drip tray 10, and making it more likely that a user can operate the clamp 20 with only one hand.

An additional advantage of the present invention is that the clamp 20 must be in position to work properly. Therefore, the clamp 20 is guaranteed to be securely locked in the proper position on the fuse holder 30.

Yet another advantage of the clamp 20 of the present invention is that because of the design, it may be used many times before it is must be replaced. Once locked, the clamp 20 also will not disengage or unlock as readily as other conventional clamps that are fatigued from repeated use.

It is to be understood that even though numerous characteristics and advantages of the present invention have been set forth in the foregoing description, together with details of the structure and function of the invention, the disclosure is illustrative only. For example, although the clamp 20 of the present intervention was described in cooperation with a fuse holder 30 drip tray 10 for a transformer 34, the clamp 20 may be used to clamp any article to another. Accordingly, changes may be made in detail, especially in matters of shape, size and arrangement of parts within the principles of the invention to the full extent indicated by the broad general meaning of the terms in which the appended claims are expressed.

What is claimed is:

1. A clamp for mounting a first article to a second article, the clamp having only two connecting members comprising a first arm and second arm,
the first arm comprising a proximal end attached to the first article and a distal male end, the male end comprising:
an insertion member;
a male mating detent protruding from the insertion member; and
a male locking detent protruding from the male end,
the second arm comprising a proximal end attached to the first article and a distal female end, the female end comprising:
a receiving member;
a female mating detent protruding from the receiving member; and
a female locking detent protruding from the receiving member,
the arrangement being such that when the insertion member mates with the receiving member, the male mating detent and the female mating detent align, and the male locking detent and the female locking detent align so that the clamp becomes locked in three perpendicular directions, the male mating detent and the female mating detent preventing the first arm from moving in a first transverse direction relative to the second arm, and the male locking detent and the female locking detent preventing the first arm from moving in a second transverse direction relative to the second arm, the second transverse direction being opposite that of the first transverse direction.

2. A clamp for mounting a drip tray to a transformer fuse holder, the clamp having only two connecting members comprising a first arm and second arm,
the first arm comprising a proximal end attached to the drip tray and a distal male end, the male end comprising:
an insertion member;
a male mating detent protruding from the insertion member; and
a male locking detent protruding from the male end,
the second arm comprising a proximal end attached to the drip tray and a distal female end, the female end comprising:
a receiving member;
a female mating detent protruding from the receiving member; and
a female locking detent protruding from the receiving member,
so that when the insertion member mates with the receiving member, the male mating detent and the female mating detent align, and the male locking detent and the female locking detent align so that the clamp becomes locked in three perpendicular directions, the male mating detent and the female mating detent preventing the first arm from moving in a first transverse direction relative to the second arm, and the male locking detent and the female locking detent preventing the first arm from moving in a second transverse direction relative to the second arm, the second transverse direction being opposite that of the first transverse direction.

3. The clamp of claim 2, wherein the clamp further comprises a base portion situated between the proximal ends and the drip tray to connect the arms to the drip tray and aid in mounting the drip tray to the fuse holder.

4. The clamp of claim 3, wherein:
the receiving member further comprises:
a base lip portion having a proximal end attached to the second arm;
a narrow arched member having a proximal end and distal end, the proximal end of the arched member extending from the proximal end of the base lip portion; and
a tip extending from the distal end of the arched member so that the base lip portion, the arched member and the tip define a receptacle within which the insertion member can be received.

5. The clamp of claim 4, wherein the arched member is flexible so that when the arched member is flexed from its natural state, the insertion member can gain access to the receptacle, yet properly mate with the receiving member when the arched member is in its natural state.

6. The clamp of claim 5, wherein:
when the arched member is not flexed, the receptacle has a substantially triangular-shaped cross section when viewed from a front perspective; and
the insertion member is an insert having a substantially triangular-shaped cross section when viewed from the front perspective.

7. The clamp of claim 6, wherein:
the tip of the receiving member has a substantially triangular-shaped cross section when viewed from the front perspective; and the receiving member has a substantially C-shaped cross section when viewed from the front perspective.

8. The clamp of claim 7, wherein the first arm and second arm are flexible such that they can be flexed to surround the fuse holder.

9. The clamp of claim 7 made of 10% glass-filled polypropylene.

10. A clamp for mounting a first article to a second article, the clamp having only two connecting members comprising a first arm and second arm, the first arm comprising a proximal end attached to the first article and a distal male end, the male end comprising:
an insertion member;
a male mating detent protruding from the insertion member; and
a male locking detent protruding from the male end, the second arm comprising a proximal end attached to the first article and a distal female end, the female end comprising:
a receiving member;
a female mating detent protruding from the receiving member; and
a female locking detent protruding from the receiving member, the arrangement being such that when the insertion member mates with the receiving member, the male mating detent and the female mating detent align, and the male locking detent and the female locking detent align so that the clamp becomes locked in three perpendicular directions.

11. The clamp of claim 10, wherein when the insertion member mates with the receiving member, the male end and female end are in a single plane and the male mating detent, the female mating detent, the male locking detent and the female locking detent prevent the male end and the female end from moving out of the single plane.

12. The clamp of claim 10, wherein when the insertion member mates with the receiving member, the male end and female mating detents are centered in separate but adjacent planes.

* * * * *